(12) United States Patent
Cotton et al.

(10) Patent No.: US 7,175,481 B1
(45) Date of Patent: Feb. 13, 2007

(54) SEALED PASS-THROUGH ELECTRICAL CONNECTOR

(75) Inventors: Kenneth J. Cotton, Caro, MI (US); Jeffrey D. Hanby, Cass City, MI (US); Kevin L. Israelson, Cass City, MI (US); Roger N. Smith, Ubly, MI (US); David L. Thomas, Cass City, MI (US)

(73) Assignee: Walbro Engine Management, L.L.C., Tucson, AZ (US)

( * ) Notice: Subject to any disclaimer, the term of this patent is extended or adjusted under 35 U.S.C. 154(b) by 0 days.

(21) Appl. No.: 11/265,403

(22) Filed: Nov. 1, 2005

(51) Int. Cl.
H01R 13/40 (2006.01)

(52) U.S. Cl. .................................. 439/733.1

(58) Field of Classification Search ............ 439/733.1, 439/556, 875, 589, 559; 174/65 R, 152
See application file for complete search history.

(56) References Cited

U.S. PATENT DOCUMENTS

| | | | |
|---|---|---|---|
| 2,152,504 A | 3/1939 | Scott et al. | |
| 2,552,414 A | 5/1951 | Erikson et al. | |
| 3,398,391 A | 8/1968 | Brishka | |
| 3,533,051 A | 10/1970 | Ziegler, Jr. | |
| 3,678,447 A | 7/1972 | Ziegler, Jr. et al. | |
| 4,373,112 A | 2/1983 | Mizuno | |
| 6,083,040 A | 7/2000 | Mosquera | |
| 6,508,666 B1 | 1/2003 | Francis | |
| 6,581,579 B1 | 6/2003 | Knight et al. | |
| 6,666,732 B1 | 12/2003 | Endacott | |
| 6,679,726 B1 | 1/2004 | Tunn et al. | |

Primary Examiner—J. F. Duverne
(74) Attorney, Agent, or Firm—Reising, Ethington, Barnes, Kisselle, P.C.

(57) ABSTRACT

A pass-through electrical connector assembly with a body having at least one through-hole formed therein. A pin is forced into the through-hole and held by the body. The pin has a shank with opposed ends, each with a blind hole to receive a wire and a solid center portion that seals the wires and the pin. The pin has a tip with a barb at one end and a head with a shoulder at the other end which captures the pin in the body after the pin is forced into the through-hole when the shoulder engages the body. The shank has a circumferential surface that is press-fit within the through-hole to form a seal between the pin and the body. The body can then be sealed to a mating flange of a fluid-holding tank.

47 Claims, 5 Drawing Sheets

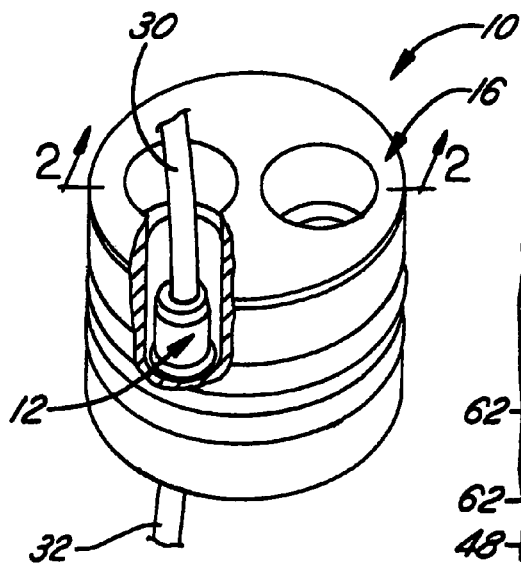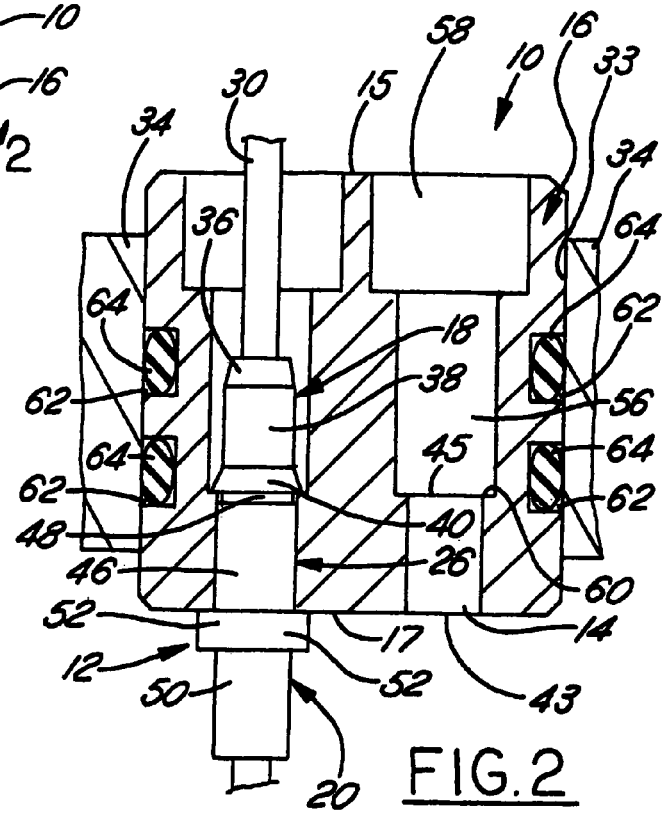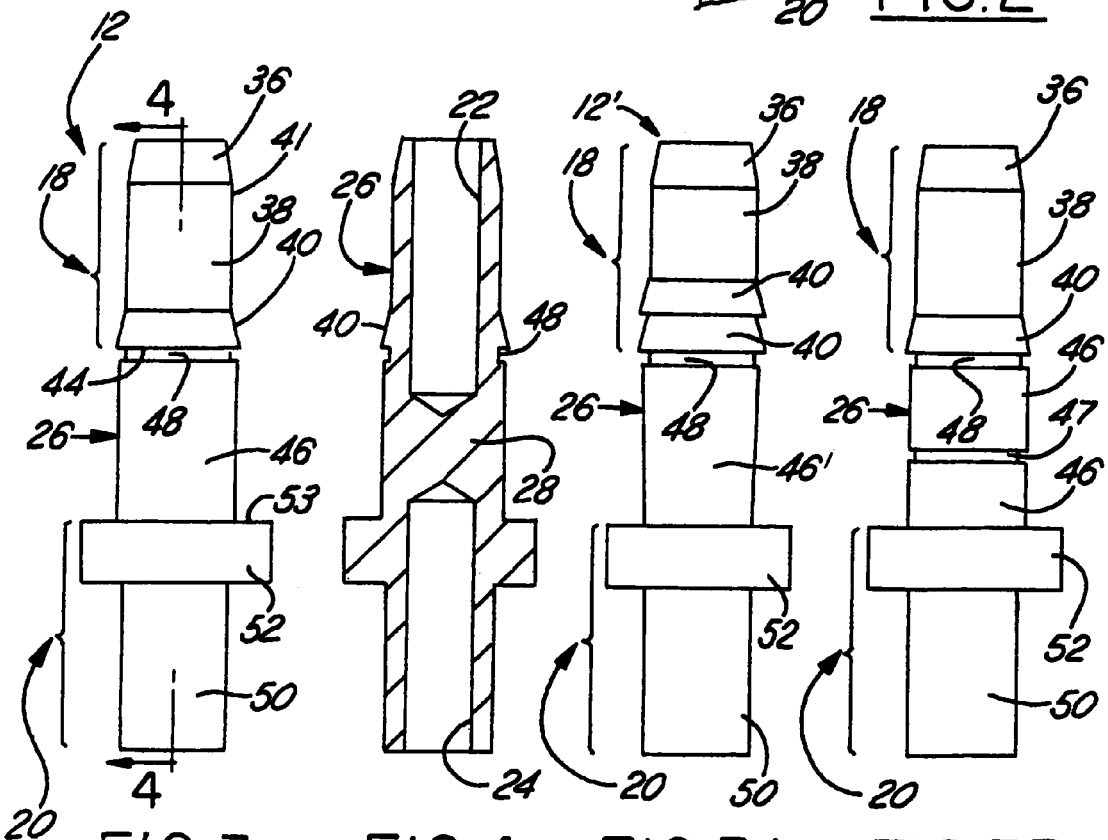

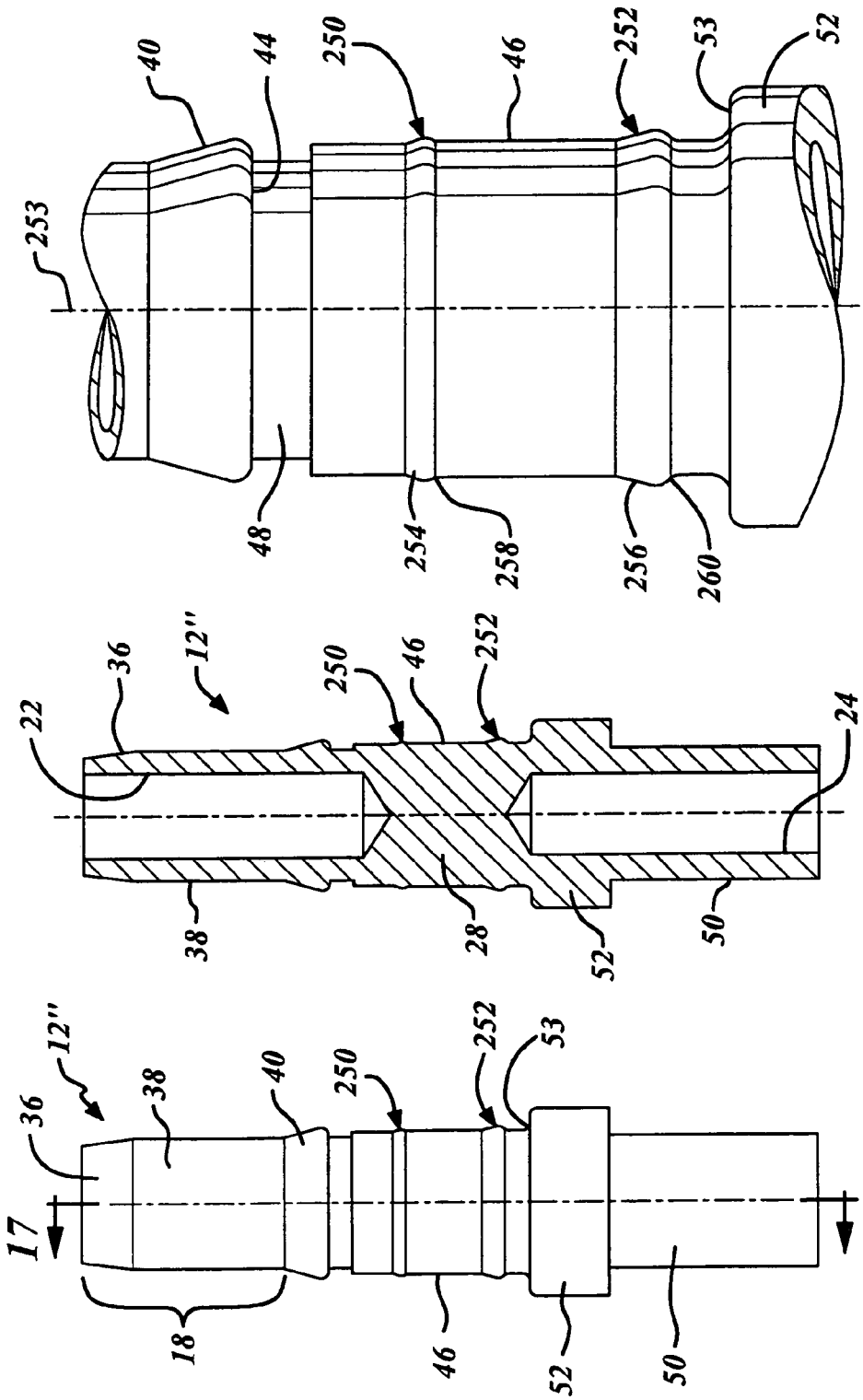

SEALED PASS-THROUGH ELECTRICAL CONNECTOR

REFERENCE TO RELATED APPLICATION

This application claims the benefit of co-pending U.S. patent application Ser. No. 10/826,894, filed on Apr. 16, 2004.

FIELD OF THE INVENTION

This invention relates to electrical connectors and, more specifically, to a pass-through electrical connector.

BACKGROUND OF THE INVENTION

A pass-through electrical connector for a fluid-holding tank usually comprises electrical wires carried by a body where the wires are sealed to prevent the fluid from passing through the wires. The body is then sealed within a flange of the fluid-holding tank. Various pass-through electrical connectors are known, such as those manufactured by Pave Technology Company and Noma Automotive. The electrical connector by Pave comprises wound wire strands with a cover portion stripped away and the strands sealed together by soldering them in the stripped region. The sealed wire is then pulled through a hole formed in a body and an epoxy is poured into the hole to create a final seal between the soldered strands and the body. The electrical connector by Noma comprises a plastic body that is injection molded around wound wire strands with the cover removed. A sealant is then incorporated, by a vacuum, into every crevice along the length of the wire strands to suitably seal the wire within the molded body. While such electrical connectors are generally effective and reliable, what is needed is a smaller, low-cost, manufacturing-friendly alternative for passing electric current through a flange or article and particularly of a fluid-holding tank.

SUMMARY OF THE INVENTION

A pass-through electrical connector assembly having at least one conductive connector pin received with an interference fit in a through-hole in a non-conductive body to seal and retain the pin in the body. Each pin has a shank with a tip and at least one barb adjacent one end and a head and a shoulder adjacent the other end. A blind hole in each end of the pin is constructed to receive a separate electrically conductive wire and a solid portion of the pin between the blind holes provides a seal between the wires and the holes. The body is of a somewhat flexible or resilient material and each through-hole in its unstressed state has a minimum diameter slightly smaller than the diameter of a circumferentially continuous portion of the shank so that when the pin is forced into the through-hole, a seal is formed between at least this circumferential portion and the body with an interference fit. If desired, the body may then be sealed to a mating flange or other portion of a fluid holding tank. If desired, the body may be an integral portion of an article, such as a fuel pump module, a fluid holding tank, a plastic fuel tank or the like.

Objects, features and advantages of this invention include a pass-through electrical connector assembly and method of making it which is highly leak resistant, reliable, may be made as an integral portion of a product, and is relatively small, of simple design, easy and inexpensive to manufacture and assemble and in service has a long useful life.

BRIEF DESCRIPTION OF THE DRAWINGS

These and other objects, features and advantages of this invention will be apparent from the following detailed description of the preferred embodiments and best mode, appended claims, and accompanying drawings in which:

FIG. 1 is a perspective view of a first embodiment of the pass-through electrical connector assembly of the present invention;

FIG. 2 is a full sectional view taken along line 2—2 of the pass-through electrical connector assembly shown in FIG. 1;

FIG. 3 is a side view of an electrically conductive pin used in the pass-through electrical connector assembly shown in FIG. 2;

FIG. 3A is a side view of a second variation of the electrically conductive pin showing a multiple-barb configuration and a tapered shank portion;

FIG. 3B is a side view of a third variation of the electrically conductive pin for receiving an elastomeric seal on the shank of the pin;

FIG. 4 is a cross-sectional view taken along line 4—4 of FIG. 3 showing blind holes in the ends of the electrically conductive pin separated by a solid center portion, which forms a fluid-tight seal between the holes and conductive wires to be received in the holes and attached to the pin;

FIG. 16 is a side view of an alternate electrically conductive pin which may be used in a pass-through electrical connector assembly;

FIG. 17 is a cross-sectional view taken generally along line 17—17 of FIG. 16; and FIG. 18 is an enlarged fragmentary view of the pin of FIG. 16.

DETAILED DESCRIPTION OF THE PREFERRED EMBODIMENTS

Figure 5:
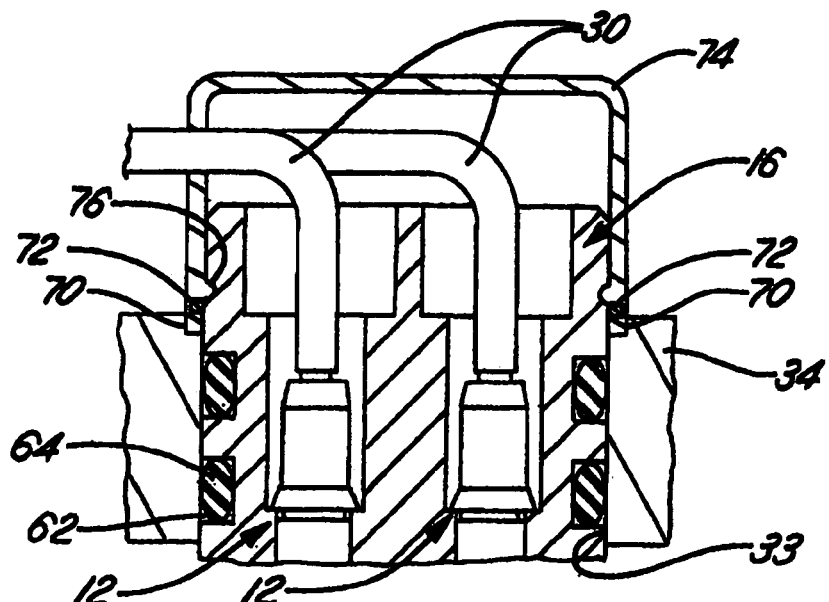
FIG. 5 is an upper portion of the pass-through electrical connector assembly of FIG. 2 showing a cover attached to the body to seal the body with the mating flange and to pinch-seal the wires.

Referring in more detail to the drawings, FIGS. 1–3 illustrate a pass-through electrical connector assembly 10 of a first embodiment of the invention. The connector assembly 10 has a pair of pins 12 (only one of which is shown) each forced with an interference fit through a separate through-hole 14 preformed in a body 16. Each pin 12 is made of an electrically conductive metal and is electrically connected to separate electric wires 30 and 32 which extend from opposite ends of the pin and the body to provide an electrically conductive path through the body. The body is made of an electrically non-conductive or insulating material which is somewhat yieldable or flexible and preferably somewhat resilient such as a plastic resin or synthetic hard rubber material. The body may be made in one piece with the through-holes therein by suitable injection molding dies and methods.

As shown in FIGS. 2–4, each pin 12 has a shank 26 with a tip 18 adjacent one end and a head 20 adjacent the other end. A blind bore 22, 24 at each end and preferably co-axial with the shank is constructed and arranged to receive separate electrically conductive wires 30 and 32 which are separated by a solid central portion 28 of the shank to provide a fluid tight seal between the blind holes and the wires. Preferably, the wires are permanently attached to the pin by soldering, brazing, crimping, cold rolling or some other technique. Preferably, after the wires are attached, the pin 12 and its associate wire 30 is inserted with the tip end 18 first into an associated through-hole 14 and pressed therein with an interference fit to provide a seal between the pin and the body and permanently retain the pin in the body. If desired, the body of the connector assembly may then be inserted into a complementary mating hole 33 through a mounting flange 34 or a part of an article in which the connector is utilized such as a fuel pump module or a fuel tank.

The pin 12 is made of or coated with a suitable electrically conductive material such as one that is typically used for electrical terminals. Preferably, the pin 12 is made of tin plated brass. Since the pin 12 is constructed to receive the wires 30, 32 in the blind holes 22, 24, respectively, the size and shape of the pin 12 and its component parts (i.e., the tip 18, head 20 and shank 26) are usually determined based on the wire gage and/or means by which the wires 30, 32 are attached to the pin. Alternatively, one or both of the ends of the pin may be solid and shaped to receive thereon a mating terminal. The length of each blind hole 22, 24 extends substantially into, but not through, the pin 12, thereby leaving the solid intermediate portion 28. Regardless of whether the pin has a blind hole in either or both ends, the solid intermediate portion 28 adequately separates the wires 30, 32 and provides a fluid-tight seal between the wires 30, 32 and the pin 12.

To pilot, center and align the connector pin 12 as it is being inserted into an associated hole 14, as shown in FIG. 3, preferably, the tip 18 has a frusto-conical end 36 which blends into a cylindrical mid-portion 38 which in turn blends into a barb 40. Preferably, the end 36 is tapered at about 10° to 15° inwardly relative to the axis of the cylindrical portion 38 which preferably has a diameter somewhat smaller than the minimum diameter of its associated through-hole 14 in the body. Preferably, the barb 40 is frusto-conical, tapers outwardly from the cylindrical portion 38, preferably at an angle 10° to 15°, and has a maximum diameter at its base 44 which is greater than the minimum diameter of its associated through-hole 14 so that in assembly the barb retains the pin in the body. During insertion, this also allows the barb 40 to scrape and "clean" the through-hole 14 of any foreign particles or other material which may improve the seal between the pin and this area of the body. When the pin is completely pressed into and seated in the through-hole 14, preferably, the base 44 will also overlie and engage a shoulder 60 of the through-hole to facilitate retention of the pin in the body. Preferably, the pin 12 also has an undercut or groove 48 at the base 44 of the barb 40 into which an adjacent portion of the body material flows to further enhance sealing and retention of the pin in the body.

In most applications, a pin 12 with a single barb 40 is believed to be satisfactory for achieving the desired fluid-tight seal and retention of the pin in the body 16 of the connector assembly. However, for some applications, better sealing may be obtained with a pin 12' as shown in FIG. 3A having two or more barbs 40 (i.e., a multiple-barb construction). With this modified pin 12', during insertion into its associated through-hole 14 in the body, improved scraping and cleanliness of the through-hole may be obtained which may remove more foreign material or particles in the through-hole as the barbs pass therethrough, thereby improving the seal between the pin and the body.

As shown in FIG. 3, the shank 26 has a central portion 46 with a circumferentially continuous and cylindrical exterior surface with a diameter slightly larger than the minimum diameter of the through-hole 14 so that when the pin 12 is pressed into and seated in the through-hole, there is an interference fit between the central portion 46 and the body 16 which provides a fluid-tight seal between them. In some applications, this seal may be improved and resistance to removal of the pin increased, as shown in FIG. 3A, by forming a central portion 46' with a slight taper in the reverse direction so that the diameter of the portion 46' progressively decreases from the recess 48 to the head portion 20. In some applications, it may be desirable to further improve the fluid-tight seal and/or permeation resistance by providing, as shown in FIG. 3B, an O-ring between the pin and the body which may be received in an annular groove 47 in the central portion 46 of the shank. For hydrocarbon fuel system applications, the O-ring should be preferably a fluorocarbon for hydrocarbon permeation resistance. The groove 48 may also provide a space for receiving any dirt particles or material from the body 16 that are displaced and not completely removed from the hole when the barb or barbs 40 are pushed through the hole 14 during insertion of the pin into the body.

To facilitate insertion of the pin 12, 12' into the body, the head 20 preferably has a cylindrical end portion 50 and an annular flange 52 extending radially outwardly thereof which provides a shoulder or surface 53 which in assembly bears on a portion of the surface 17 of the body immediately adjacent the hole 14 in which the pin is received. To facilitate retention of the pin in the body, preferably, the axial distance between the shoulder 53 and the base 44 of the barb 40 is substantially equal to the axial distance between the bottom surface 17 and the shoulder 60 of the body engaged by the barb. In assembly, this construction captures the pin 12 in the body 16 so that it cannot be removed. If it is desired to attach the wire 32 to the head 20 by a mating terminal, the end portion 50 may include a thread, knurl or a rib for receiving a complementary end of the mating terminal over the end portion 50 of the head.

As shown in FIG. 2, the body 16 of the pass-through electrical connector assembly 10 of the first embodiment is a separate one-piece housing member made of a plastic or synthetic rubber material and if used in a fuel system is compatible with fuel. For use in fuel systems, the body 16 is preferably made of a low hydrocarbon permeation material. More preferably the body 16 is made of acetal (e.g., Delrin or Celcon), polyamide (Nylon) or polyphthalimide (Amodel) resins, having a tensile strength in the range of 150,000 psi to about 550,000 psi for unfilled resins. Glass-filled resins can have tensile strengths in the range of 150,000 psi to 2,000,000 psi. Preferably, the material of the body 16 also has good creep resistance so that the interference fit between the body and the pin is maintained. The body 16 is generally cylindrically shaped but may have other shapes, such as an oval or rectangular shape, depending on the shape of the opening of the mating flange 34 in which the body 16 will be received. The size of the body 16 is usually determined based on the number, size and layout of the pins/wires needed for the electrical connector assembly 10.

As shown in FIG. 2, the end 45 of the through-hole 14 communicates with a clearance or access hole or counterbore 56. The access hole 56 forms the shoulder 60 on which the base 44 of the barb 40 bears when the pin 12 is assembled in the through-hole 14. Since the tip 18 comprises a flying lead for the wire 30, the access hole 56 may be filled with a sealing material or sealant, such as silicone, epoxy or potting compound to prevent contamination of the wire 30 by dirt particles. Another hole or counterbore 58 may be formed at the top of the access hole 56 that can receive a grommet (not shown) or a sealant for further protection of the wires 30 from foreign particles and contaminants.

Preferably, each pin 12 is pressed into the body 16 at ambient temperature and with the wires 30, 32 pre-attached to the pin. Wire 32 and the tip 18 are first inserted generally coaxially into the end of an associated through-hole 14 and then a force is applied to the head 20 of the pin 12 in the direction of the tip 18 to press the tip 18 and the barb 40 into and through the through-hole 14. The barb 40 cleans the through-hole 14 as it passes through it and then bears on the shoulder 60 at the end 45 of the through-hole 14 and the flange 52 engages the bottom surface 17 of the body at the first end 43 of the through-hole 14. Once all of the pins 12 have been seated in the body 16, a sealant can then be introduced into the access holes 56 to protect the wires 30.

After all the pins 12 have been seated in the body 16, the body can be assembled to the mating flange 34. Preferably, the outer diameter of the body 16 is equal to or slightly larger than the inner diameter of the mating hole 33 in the flange 34. Thus, the body 16 can be pressed into the hole in the mating flange 34 and retained in and sealed to the flange 34 by frictional engagement. Alternatively, the body can have a diameter slightly smaller than the mating hole 33 in the flange and be retained and sealed therein. As shown in FIG. 2, retention and sealing may be provided or improved by providing the body 16 with annular grooves 62 that receive elastomeric seals, such as O-rings 64 which in assembly are compressed and prevent fluid from leaking or permeating between the body 16 and the flange 34.

Since the pass-through electrical connector assembly 10 is formed separately from the mating flange 34 and the mating flange can have a number of different configurations and orientations, the body 16 and/or the mating flange 34 may include additional features to provide a good seal between them. As shown in FIG. 5, the mating flange 34 may include an appropriate groove or recess 70 that receives an O-ring 72 providing a seal between the body 16 and the mating flange 34. The O-ring 72 can then be retained further by a cover 74 that can be threaded or snapped onto the body 16 such as by a rib 76 received in a complementary groove or threads in the body 16. The cover 74 also can be used to gather and organize the flying leads of the wires 30 attached to the pins 12 to create a pinch-seal. The gathered wires 30 can then be easily attached to, for example, another electrical terminal.

Figure 6:
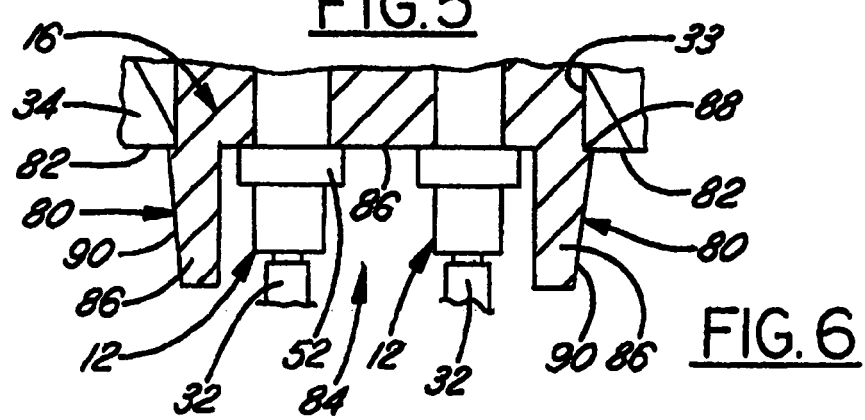
FIG. 6 is a bottom portion of a modified pass-through electrical connector assembly of FIG. 2 showing a snap latch formed in the body for retaining the body in the mating flange.
Figure 7:
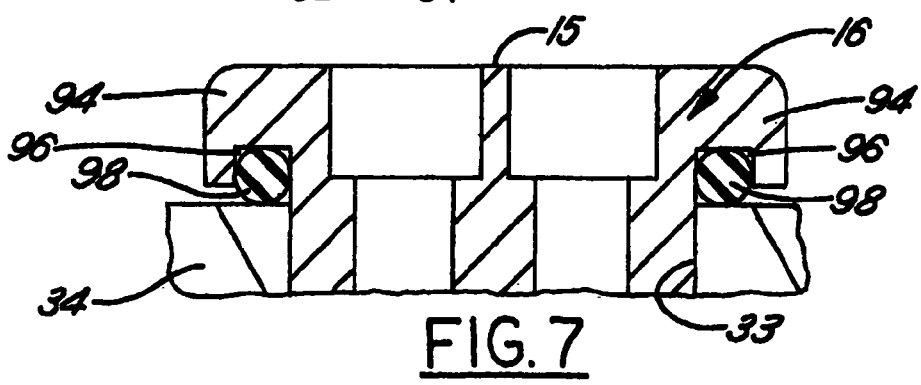
FIG. 7 is an upper portion of the pass-through electrical connector assembly of FIG. 6 showing an annular flange formed on the body for retaining and sealing the body to the mating flange.

If frictional retention of the body 16 in the mating flange 34 is insufficient, as shown in FIG. 6, the body 16 may include a snap latch 80 which is preferably annular and engages the bottom surface 82 of the mating flange 34. The latch is preferably integral with the body 16 and has an axially projecting flexible and resilient finger 86 with a shoulder 88 which in assembly engages the body and a sidewall 90 which tapers outwardly of the free end of the finger to facilitate assembly. When the body 16 is inserted into the hole 33 of the mating flange, the tapered surface 90 flexes the finger generally radially inwardly until the finger snaps outwardly so that the latch 88 overlaps the surface 82 of the flange to retain the body therein. As shown in FIG. 7, to further facilitate the retention, the body 16 may have an annular flange or head 94 which in assembly overlies the flange 34. If desired, an O-ring 98 may be received in an annular groove 96 in the head 94 to provide a further seal between the body and the mating flange. Other lathe cut or molded seals with rectangular, X or other cross-sections, may also be used.

Figure 8:
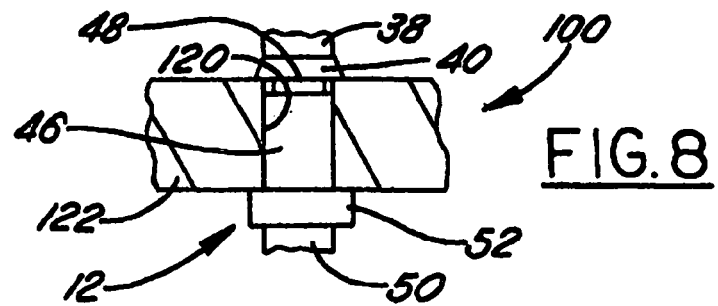
FIG. 8 is a fragmentary cross-sectional view of a second embodiment of the pass-through electrical assembly of the present invention in which each electrically conductive pin is forced directly through the mating flange or wall of an article.
Figure 9:
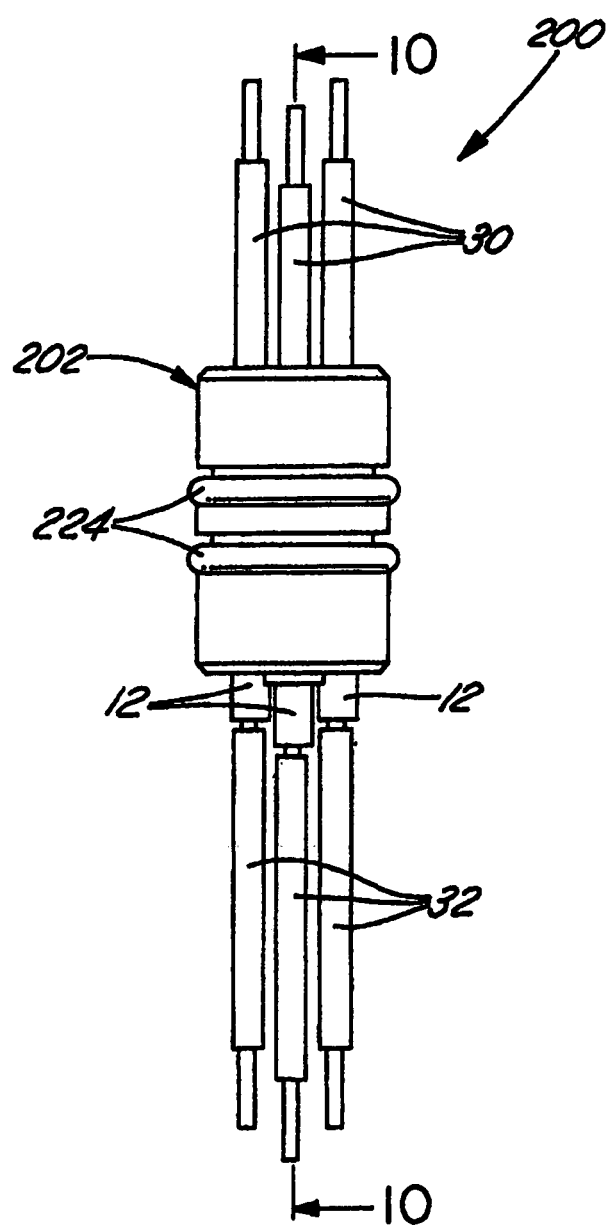
FIG. 9 is a side view of a third embodiment of the pass-through electrical connector assembly of the present invention showing a stepped configuration of a multiple-pin connector.
Figure 10:
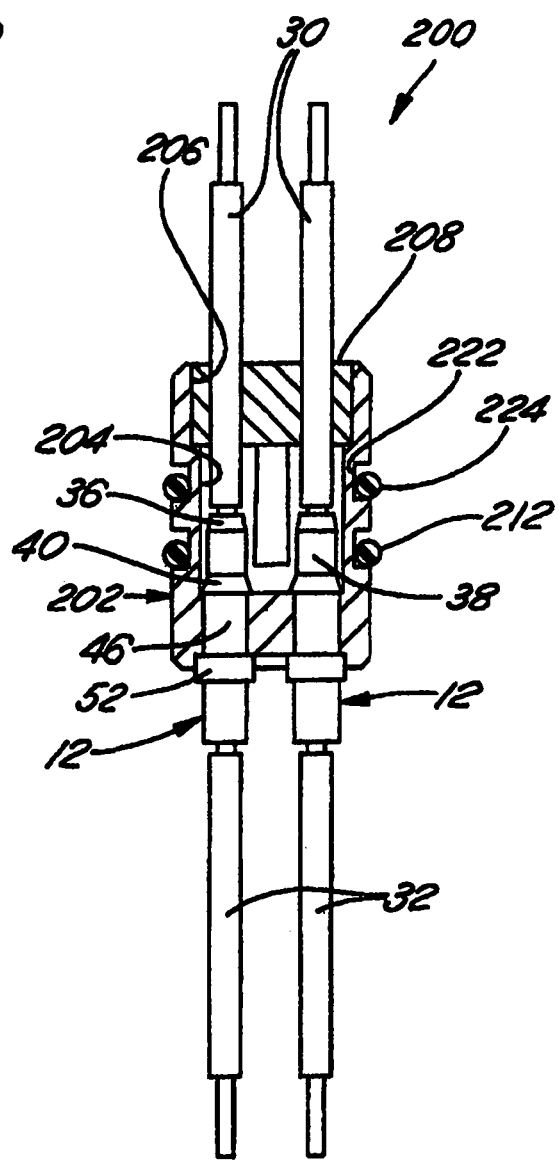
FIG. 10 is a full sectional view taken along line 10—10 of the pass-through electrical connector assembly of FIG. 9.
Figure 11:
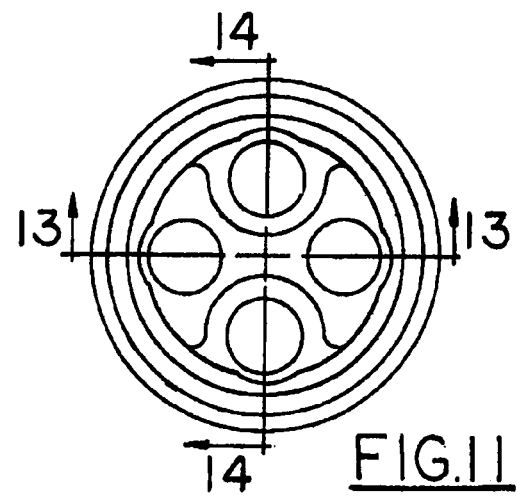
FIG. 11 is a view of one end of the body of the pass-through electrical connector assembly of FIG. 9.
Figure 14:
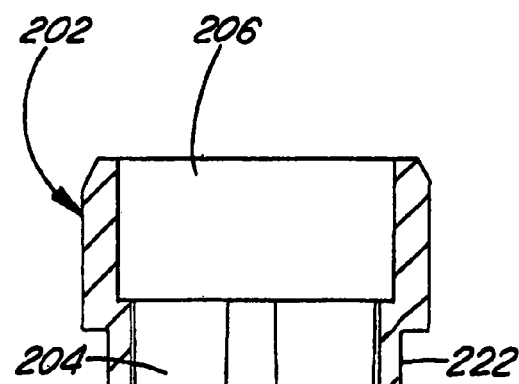
FIG. 14 is a cross-sectional side view of the body of the pass-through electrical connector assembly of FIG. 9 taken along line 14—14 of FIG. 11.
Figure 13:
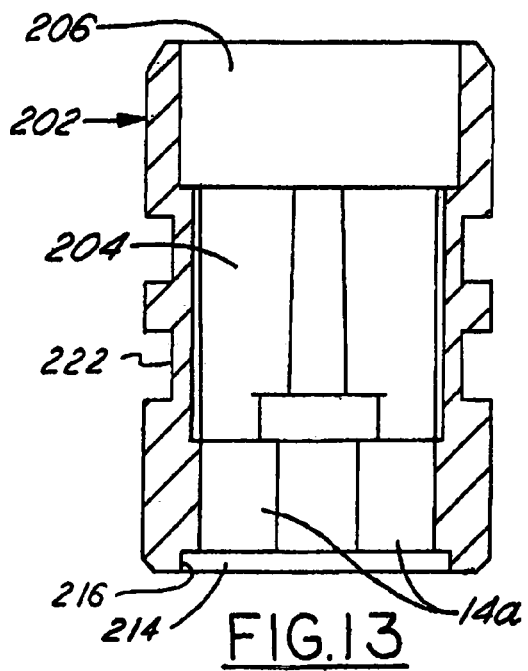
FIG. 13 is a cross-sectional side view of the body of the pass-through electrical connector assembly of FIG. 9 taken along line 13—13 of FIG. 11.

FIG. 8 illustrates a second embodiment of the present invention of a pass-through electrical connector assembly 100 with at least one pin 12 received in a through-hole 120 in a flange or a wall 122 of a plastic material of an article such as fuel pump module or a plastic fuel tank. Each pin 12 is press fit into an associated hole 120 and retained therein by its barb 40 and flange 52. Since this connector assembly 100 does not have a separate body 16, the fluid and permeation sealing function is performed by the seal between the wires 30, 32 and the pin 12, and the seal between the pin 12 in the hole 120 in the plastic flange or wall 122 which is provided by the interference fit between them. The connector assembly may utilize any and all the pin arrangements of FIGS. 3, 3A, 3B and 4.

Figure 15:
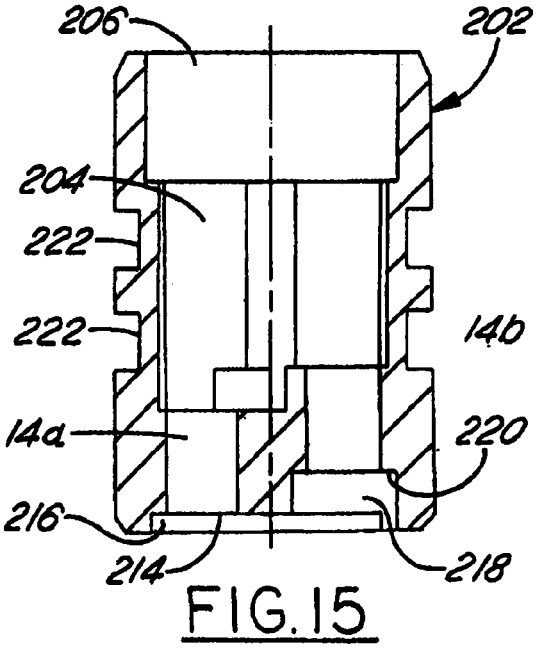
FIG. 15 is a cross-sectional side view taken along line 15—15 of FIG. 12.
Figure 12:
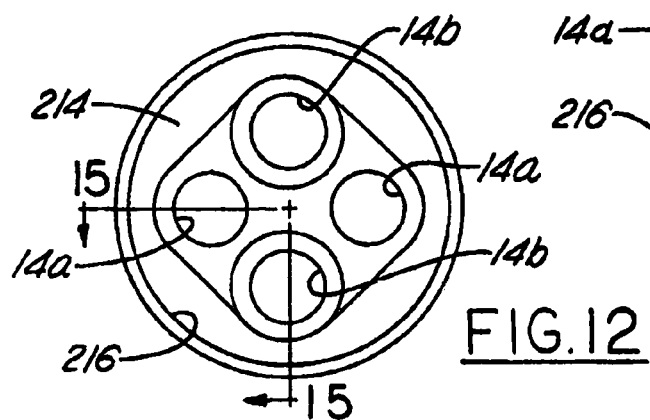
FIG. 12 is a view of the other end of the body of the pass-through electrical connector assembly of FIG. 9.

In electrical connectors having two or more pins which are only slightly spaced apart radially, it may be desirable to generally axially offset or stagger adjacent pins to insure that none of the pins touch or contact each other which might short out or interrupt an electrical connection or circuit. FIGS. 9–15 illustrate a third embodiment of this invention in an electrical connector assembly 200 having four connector pins 12 with adjacent pins sufficiently axially offset in a body 202 so that the seated pins do not contact each other even though the flanges 52 of the head portions are in close proximity and even may be radially overlapped. As best shown in FIG. 15, in body 202, adjacent holes 14a and 14b are axially offset or stepped relative to each other a distance greater than the axial extent or thickness of the flange 52 of the head portion of the pins so that when seated in the body, the pins do not contact or engage each other. Except for being axially offset or stepped, the through holes 14a, 14b have essentially the same construction and arrangement as the through holes 14 in the body 16 of the connector assembly 10. At the leading end, the holes 14a open into a generally planar face 214 of a recess 216 in the body 202 and each hole 14b opens into a counterbore 218 which forms a shoulder 220 and opens into the face 214.

When installing the pins in the body 202, a pin 12 is inserted and seated in each of the through holes 14b before pins 12 are inserted in the through-holes 14a. When installed and seated in the body, the flange 52 of the pin in each hole 14a preferably bears on the face 212 and the flange 52 of the pin in each hole 14b preferably bears on the shoulder 220 formed by the counterbore 218.

Preferably, the body 202 has a common clearance or access hole or opening 204 and a common hole or counterbore 206 for all of the pin tips 18 and flying lead wires 30 which, after the pins are seated therein, may be filled with a grommet or sealant 208 (FIG. 10) such as silicone, epoxy or potting compound for the flying lead wires emerging from each pin. If desired, grooves 222 may be provided in the body 202 for each receiving an O-ring 224 to provide a seal between the connector assembly 200 and a complementary hole in a flange or article in which it is mounted or received.

FIGS. 16–18 illustrate another presently preferred implementation of an electrically conductive pin 12" that may be used in a pass-through electrical connector assembly. The pin 12" preferably is constructed similarly to the pin 12, with the same reference numbers used to indicate like parts. For example, the pin 12" preferably includes blind bores 22, 24, on opposed sides or ends of a solid portion 28, a tip 18 with a frusto-conical end 36, a cylindrical mid-portion 38, a barb or barbs 40, base 44, central portion 46, recess 48, end portion 50, flange 52, and shoulder 53, by way of example without limitation.

In the area of the pin 12" disposed within a corresponding hole (e.g. 14 or 120), at least one rib extends radially outwardly from the adjacent surfaces of the pin 12". As best shown in FIG. 18, preferably a first rib 250 and a second rib 252 are provided axially spaced apart and extending outwardly from the central portion 46 between the base 44 and shoulder 53. While shown as parallel to each other and perpendicular to an axis 253 of the pin 12", the ribs 250, 252 may be inclined relative to each other, to the axis, or both. The ribs 250, 252 are circular in the implementation shown, but they may be otherwise shaped, and may have wave-like or other profile, as desired. The first rib 250 is located closer to the base 44, and may have an outer diameter that is slightly smaller than the outer diameter of the second rib 252 to facilitate insertion of the pin 12" into a hole since the first rib 250 leads and will travel further within the hole than the second rib 252 given the direction of insertion of the pin 12". Each rib 250, 252 preferably includes a leading edge 254, 256, respectively, disposed at a relatively shallow angle to provide a smooth transition from the central portion 46 to a maximum outer diameter section of the rib 250, 252, and a trailing edge 258, 260, respectively, disposed at a steeper angle from the central portion 46 to the maximum outer diameter section. Each rib 250, 252 preferably is formed in one-piece with the rest of the pin 12". The ribs 250, 252 provide circumferentially continuous areas of increased interference or compression of the material of the body to improve the seal between the body and pin 12". Otherwise, the pin 12" may be utilized in the same fashion as the pin 12, and may have wires connected thereto in similar manner.

Persons of ordinary skill will appreciate that the axially offset arrangement of adjacent pins 12, 12', 12" illustrated in connector assembly 200 may also be utilized in a connector assembly formed directly in a flange or article which does not have a separate body in which the pins 12, 12', 12" are mounted and carried. Skilled persons will also appreciate that various modification and changes may be made from the preferred embodiments disclosed herein and/or even though some connector assemblies may not contain all of the features and advantages of the preferred embodiments they still will be within the scope and spirit of the connector assemblies and methods defined by the following claims.

The invention claimed is:

1. A pass-through electrical connector assembly comprising:
    a body of an electrically insulative and somewhat yieldable plastic or rubber material;
    at least one through-hole formed in said body with a shoulder adjacent to the through-hole; and
    an electrically conductive pin forced into said through-hole and retained in said body, said pin having:
        first and second ends each having a recess therein constructed to receive and have permanently attached thereto a separate electrically conductive wire;
        an intermediate solid portion between said recesses constructed to separate said wires and provide a fluid-tight seal between said wires and said pin;
        a tip adjacent said first end of said pin, said tip having at least one barb constructed to engage said body and overlie a portion of said shoulder adjacent to the through-hole when said pin is forced into said through-hole;
        a head formed adjacent said second end of said pin, said head having a shoulder constructed to engage said body when said pin is forced into said through-hole; and
        a circumferentially continuous exterior surface between said ends press-fit into said through-hole of said body with an interference fit with said body and forming a fluid-tight seal between said pin and said body.

2. A pass-through electrical connector assembly as defined in claim 1 wherein said body is a housing constructed of plastic.

3. A pass-through electrical connector assembly as defined in claim 1 wherein said body is a housing constructed of synthetic rubber.

4. A pass-through electrical connector assembly as defined in claim 1 wherein said body is made of a low hydrocarbon permeation material.

5. A pass-through electrical connector assembly as defined in claim 1 which also comprises a flange having a hole complementary to said body and said body is received in said hole in said flange and sealed to said flange.

6. A pass-through electrical connector assembly as defined in claim 5 wherein said body comprises a snap latch constructed to retain said body in said flange.

7. A pass-through electrical connector assembly as defined in claim 5 wherein said body comprises a retainer sealing said body to said flange.

8. A pass-through electrical connector assembly as defined in claim 1 which also comprises at least one elastomeric seal between said pin and said body.

9. A pass-through electrical connector assembly as defined in claim 1 wherein said pin has a separate blind hole with a circumferentially continuous sidewall opening into each of said ends of said pin and constructed to receive a separate wire in each blind hole permanently attached therein.

10. A pass-through electrical connector assembly as defined in claim 1 wherein said pin has a blind hole with a circumferentially continuous sidewall opening into one of said first and second ends and constructed to receive a wire in the blind hole permanently attached therein and the other of said ends is solid.

11. A pass-through electrical connector assembly as defined in claim 1 wherein said circumferential surface is cylindrical.

12. A pass-through electrical connector assembly as defined in claim 1 wherein said circumferential surface is tapered.

13. A pass-through electrical connector assembly as defined in claim 1 wherein the maximum diameter of said barb is larger than the maximum diameter of said circumferentially continuous surface of said pin.

14. A pass-through electrical connector assembly as defined in claim 1 wherein said shoulder of said head is diametrically larger than said circumferentially continuous surface of said pin.

15. A pass-through electrical connector assembly as defined in claim 1 wherein said circumferentially continuous surface of said pin is diametrically larger than said through-hole prior to said pin being forced into said through-hole.

16. A pass-through electrical connector assembly as defined in claim 1 wherein the circumferentially continuous exterior surface is defined by a radially outwardly extending rib.

17. A pass-through electrical connector assembly as defined in claim 16 wherein said first and second ends of said pin are solid.

18. A pass-through electrical connector assembly as defined in claim 17 wherein at least one end of said pin is adapted to receive thereon an engaging terminal for a wire.

19. A pass-through electrical connector assembly as defined in claim 17 wherein said first and second ends of said pin are each adapted to receive thereon an engaging terminal for a wire.

20. A pass-through electrical connector assembly as defined in claim 16 wherein the rib has a leading edge disposed at an acute included angle relative to an adjacent surface of the pin and a trailing edge disposed at an acute included angle relative to an adjacent surface of the pin with the angle of the leading edge being shallower than the angle of the trailing edge.

21. A pass-through electrical connector assembly as defined in claim 16 wherein the rib is disposed between the barb and the shoulder.

22. A pass-through electrical connector assembly as defined in claim 1 wherein the circumferentially continuous exterior surface is defined by more than one radially outwardly extending rib.

23. A pass-through electrical connector assembly as defined in claim 22 wherein each rib is spaced from each other rib.

24. A pass-through electrical connector assembly as defined in claim 23 wherein each rib is adapted to form a circumferentially continuous seal with a body in which the pin is received.

25. A pass-through electrical connector assembly as defined in claim 22 wherein a first rib and a second rib are provided with a first rib leading the second rib relative to the direction of insertion of the pin into a body and being of smaller maximum outer diameter than the second rib.

26. A pass-through electrical connector assembly as defined in claim 1 wherein the through-hole includes a shoulder and said barb defines a base that overlies and engages the shoulder and has a maximum diameter that is greater than the minimum diameter of the through hole.

27. A pass-through electrical connector assembly comprising:
a body of an electrically insulative and somewhat yieldable plastic or rubber material;
at least one through-hole formed in said body; and
an electrically conductive pin forced into said through-hole and retained in said body, said pin having:
first and second ends each having a recess therein constructed to receive and have permanently attached thereto a separate electrically conductive wire;
an intermediate solid portion between said recesses constructed to separate said wires and provide a fluid-tight seal between said wires and said pin;
a tip adjacent said first end of said pin, said tip having at least one barb constructed to engage said body when said pin is forced into said through-hole;
a head formed adjacent said second end of said pin, said head having a shoulder constructed to engage said body when said pin is forced into said through-hole; and
a circumferentially continuous exterior surface between said ends press-fit into said through-hole of said body with an interference fit with said body and forming a fluid-tight seal between said pin and said body;
wherein said body has at least two through-holes formed in said body and adjacent through-holes are axially offset relative to each other so that the shoulders of the pin received in adjacent through-holes are axially offset relative to each other.

28. A pass-through electrical connector assembly comprising:
a body of an electrically insulative and somewhat yieldable plastic or rubber material;
at least one through-hole formed in said body; and
an electrically conductive pin forced into said through-hole and retained in said body, said pin having:
first and second ends each having a recess therein constructed to receive and have permanently attached thereto a separate electrically conductive wire;
an intermediate solid portion between said recesses constructed to separate said wires and provide a fluid-tight seal between said wires and said pin;
a tip adjacent said first end of said pin, said tip having at least one barb constructed to engage said body when said pin is forced into said through-hole;
a head formed adjacent said second end of said pin, said head having a shoulder constructed to engage said body when said pin is forced into said through-hole; and
a circumferentially continuous exterior surface between said ends press-fit into said through-hole of said body with an interference fit with said body and forming a fluid-tight seal between said pin and said body;
wherein said tip has a frusto conical portion at said first end to facilitate insertion of said pin into said through-hole.

29. A pass-through electrical connector assembly comprising:
a body of an electrically insulative and somewhat yieldable plastic or rubber material;
at least one through-hole formed in said body; and
an electrically conductive pin forced into said through-hole and retained in said body, said pin having:
first and second ends each having a recess therein constructed to receive and have permanently attached thereto a separate electrically conductive wire;

an intermediate solid portion between said recesses constructed to separate said wires and provide a fluid-tight seal between said wires and said pin;
a tip adjacent said first end of said pin, said tip having at least one barb constructed to engage said body when said pin is forced into said through-hole;
a head formed adjacent said second end of said pin, said head having a shoulder constructed to engage said body when said pin is forced into said through-hole; and
a circumferentially continuous exterior surface between said ends press-fit into said through-hole of said body with an interference fit with said body and forming a fluid-tight seal between said pin and said body;
wherein said tip is diametrically smaller than said circumferentially continuous surface of said pin.

30. A pass-through electrical connector assembly comprising:
a body of an electrically non-conductive and somewhat yieldable material;
at least two through-holes each formed in said body; and
a separate pin of an electrically conductive material forced into each one of said through-holes and retained in said body, each said pin having:
a shank with opposed ends each constructed to receive and have permanently attached thereto a separate wire;
a solid portion between said wires received on said opposed ends and providing a fluid-tight seal between said wires and said pin;
a tip formed adjacent one end of said pin, said tip having at least one barb constructed to engage said body when said pin is forced into said through-hole;
a head formed adjacent the other end of said pin, said head having a shoulder constructed to engage said body when said pin is forced into said through-hole; and
an intermediate portion of said shank having a circumferentially continuous exterior surface press-fit within said through-hole of said body with an interference fit with said body thereby forming a fluid-tight seal between said pin and said body.

31. A pass-through electrical connector assembly as defined in claim 20 wherein said body is made of a plastic material.

32. A pass-through electrical connector assembly as defined in claim 20 wherein said body is received in a complementary hole in a flange and said body has a snap latch constructed to engage said flange.

33. A pass-through electrical connector assembly as defined in claim 20 wherein said body is made of a low permeation material.

34. A pass-through electrical connector assembly as defined in claim 30 wherein said tip is diametrically smaller than said intermediate portion of said shank.

35. A pass-through electrical connector assembly as defined in claim 30 wherein the maximum diameter of said barb is larger than the maximum diameter of said circumferential surface of said intermediate portion of said shank.

36. A pass-through electrical connector assembly as defined in claim 30 wherein said shoulder of said head is diametrically larger than said intermediate portion of said shank.

37. A pass-through electrical connector assembly as defined in claim 30 wherein said maximum diameter of said intermediate portion is larger than said minimum diameter of said through-hole.

38. A method of forming a pass-through electrical connector assembly comprising:
providing a body of an electrically non-conductive and somewhat yieldable plastic or rubber material having at least one through-hole therein with a shoulder adjacent to the through-hole,
providing an electrically conductive pin having a shank with opposed ends and at least one of the ends constructed to receive and have permanently attached thereto an electrically conductive wire,
a tip having a barb adjacent one end,
a head having a shoulder adjacent the other end, and
an intermediate portion having a circumferentially continuous exterior surface with a maximum diameter larger than the minimum diameter of the through-hole of the body,
inserting the tip of the pin into the through-hole and forcing the barb into and through the through-hole with the barb disposed over a portion of said shoulder adjacent to the through-hole and the intermediate portion into the through-hole to provide an interference fit of at least the circumferentially continuous exterior surface in the body providing a fluid-tight seal between the pin and the body.

39. The method of claim 38 which also comprises providing a blind hole with a circumferentially continuous sidewall opening into the pin, inserting an electrically conductive wire into the blind hole and permanently attaching at least a portion of the wire in the blind hole to the pin.

40. The method of claim 39 which also comprises soldering at least a portion of the wire in the blind hole to the pin.

41. The method of claim 39 which also comprises crimping the pin to firmly engage and permanently retain at least a portion of the wire in the blind hole.

42. The method of claim 38 which comprises prior to inserting the pin into the through-hole, the steps of providing a blind hole in the pin which opens onto one end of the pin and has a circumferentially continuous sidewall, inserting one end of an electrically conductive wire into the blind hole, and permanently attaching at least a portion of the wire in the blind hole to the pin.

43. The method of claim 38 which also comprises prior to inserting the pin into the through-hole in the body, the steps of providing in the pin a first blind hole opening onto one end of the pin and having a circumferentially continuous sidewall, and a second blind hole opening onto the other end of the pin and having a circumferentially continuous sidewall, with the intermediate portion disposed between the blind holes, inserting one end of a first conductive wire into one of the blind holes, inserting one end of a separate second conductive wire into the other blind hole, permanently attaching at least a portion of the wire in each blind hole to the pin, and subsequently inserting one of the wires into the through-hole so that after the step of inserting the pin into the through-hole of the body is completed the first and second wires extend out of and beyond generally opposed ends of the body.

44. A pass-through electrical connector assembly comprising:
a body of an electrically insulative and somewhat yieldable polymeric material;
at least one through-hole formed in said body; and an electrically conductive pin forced into said through-hole and retained in said body, said pin having:
  first and second ends each having a recess therein constructed to receive and have permanently attached thereto a separate electrically conductive wire;
  an intermediate solid portion between said recesses constructed to separate said wires and provide a fluid-tight seal between said wires and said pin;
  a tip adjacent said first end of said pin, said tip having at least one barb constructed to engage said body when said pin is forced into said through-hole;
  a shoulder adjacent said second end of said pin and constructed to engage said body when said pin is forced into said through-hole; and
  a circumferentially continuous exterior surface between said ends, including at least one radially outwardly extending rib, press-fit into said through-hole of said body with an interference fit with said body and forming a fluid-tight seal between said pin and said body.

45. A pass-through electrical connector assembly as defined in claim 44 wherein the circumferentially continuous exterior surface includes more than one radially outwardly extending rib.

46. A pass-through electrical connector assembly as defined in claim 45 wherein each rib is spaced from each other rib.

47. A pass-through electrical connector assembly as defined in claim 44 wherein said at least one rib is disposed between the barb and the shoulder.

* * * * *